United States Patent
Connor et al.

(10) Patent No.: US 9,029,033 B2
(45) Date of Patent: May 12, 2015

(54) COMPOSITE END CELL THERMAL BARRIER WITH AN ELECTRICALLY CONDUCTING LAYER

(75) Inventors: Eric J. Connor, Rochester, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 12/900,709

(22) Filed: Oct. 8, 2010

(65) Prior Publication Data

US 2012/0088174 A1 Apr. 12, 2012

(51) Int. Cl.
*H01M 8/04* (2006.01)
*H01M 8/24* (2006.01)
*H01M 8/10* (2006.01)

(52) U.S. Cl.
CPC .............. *H01M 8/2465* (2013.01); *Y02E 60/50* (2013.01); *H01M 8/04* (2013.01); *H01M 2008/1095* (2013.01)

(58) Field of Classification Search
CPC ............ H01M 8/0267; H01M 8/0297; H01M 8/04007; H01M 8/04067; H01M 8/04074; H01M 8/04052; H01M 8/04268
USPC .......................................... 429/433, 452, 468
See application file for complete search history.

(56) References Cited

U.S. PATENT DOCUMENTS

| 4,956,245 | A | * | 9/1990 | Shimizu et al. ............... | 429/434 |
|---|---|---|---|---|---|
| 6,953,632 | B2 | * | 10/2005 | Hayashi et al. ............... | 429/435 |
| 7,160,640 | B2 | * | 1/2007 | Houlberg ..................... | 429/434 |
| 7,687,132 | B1 | | 3/2010 | Gross et al. | |
| 7,972,721 | B2 | * | 7/2011 | Kozu et al. .................. | 429/184 |
| 8,287,895 | B1 | * | 10/2012 | Kisailus et al. ............... | 424/423 |
| 2004/0247967 | A1 | * | 12/2004 | Resnick et al. ................ | 429/26 |
| 2005/0058865 | A1 | * | 3/2005 | Thompson et al. ............ | 429/26 |
| 2005/0084732 | A1 | * | 4/2005 | Breault et al. ................ | 429/34 |
| 2005/0277009 | A1 | * | 12/2005 | Mukuda et al. ............... | 429/34 |
| 2006/0210856 | A1 | * | 9/2006 | Bradean et al. ................ | 429/26 |
| 2006/0240300 | A1 | * | 10/2006 | Thompson et al. ............ | 429/26 |
| 2006/0269824 | A1 | * | 11/2006 | Hampden-Smith et al. .... | 429/40 |
| 2007/0231656 | A1 | * | 10/2007 | Andreas-Schott et al. ..... | 429/34 |
| 2007/0264556 | A1 | * | 11/2007 | Andreas-Schott et al. ..... | 429/35 |
| 2009/0017353 | A1 | * | 1/2009 | Yoshida et al. ................ | 429/26 |
| 2009/0061121 | A1 | * | 3/2009 | Omata et al. ................ | 428/32.5 |
| 2009/0286134 | A1 | * | 11/2009 | Kim et al. ..................... | 429/34 |
| 2010/0159398 | A1 | | 6/2010 | Rock et al. | |
| 2010/0253215 | A1 | * | 10/2010 | Fukagawa et al. ............ | 313/504 |
| 2011/0008702 | A1 | * | 1/2011 | Connor et al. ................ | 429/468 |
| 2011/0287332 | A1 | * | 11/2011 | Connor et al. ................ | 429/434 |

FOREIGN PATENT DOCUMENTS

| JP | 61-230273 | * | 10/1986 | .......... H01M 8/0206 |
|---|---|---|---|---|
| WO | WO 2007/129059 | * | 12/2007 | .............. H01M 8/04 |

* cited by examiner

*Primary Examiner* — Ula C Ruddock
*Assistant Examiner* — Amanda Barrow
(74) *Attorney, Agent, or Firm* — Fraser Clemens Martin & Miller LLC; James D. Miller

(57) ABSTRACT

A barrier layer for a fuel cell assembly is disclosed, the barrier layer having a thermally insulating layer having a first surface and a second surface, and an electrically conducting layer formed on the first surface of the thermally insulating layer. The thermally insulating layer may include a plurality of apertures formed therethrough, and the electrically conducting layer may be formed on a second surface of the thermally insulating layer and on the walls of the thermally insulating layer forming the apertures.

9 Claims, 4 Drawing Sheets

COMPOSITE END CELL THERMAL BARRIER WITH AN ELECTRICALLY CONDUCTING LAYER

FIELD OF THE INVENTION

The invention relates to a fuel cell assembly, and more specifically to a fuel cell assembly having a thermally insulating, electrically conducting layer disposed between a terminal plate and a unipolar end plate thereof to mitigate thermal losses from the unipolar end plate and fluid condensation and ice formation in an end fuel cell while maximizing an electric current flowing through the layer.

BACKGROUND OF THE INVENTION

Fuel cell assemblies convert a fuel and an oxidant to electricity. One type of fuel cell power system employs a proton exchange membrane (hereinafter "PEM") to separate electrodes that facilitate catalytic reaction of fuels (such as hydrogen) and oxidants (such as air or oxygen) to generate electricity. The PEM is typically a solid polymer electrolyte membrane that facilitates transfer of protons from an anode to a cathode in each individual fuel cell normally deployed in a fuel cell power system.

In a typical fuel cell assembly (or stack) within a fuel cell power system, individual fuel cell plates include channels through which various reactants and cooling fluids flow. Fuel cell plates are typically designed with straight or serpentine flow channels. Such flow channels are desirable as they effectively distribute reactants over an active area of an operating fuel cell, thereby maximizing performance and stability. In below-freezing temperatures, water vapor in the fuel cell assembly may condense. Further, the condensate may form ice in the fuel cell assembly. The presence of condensate and ice may affect the performance of the fuel cell assembly.

During typical operating conditions, condensate may also accumulate at the edges of the fuel cell plates adjacent outlet manifolds of the fuel cell assembly, thereby restricting fluid flow from the flow channels to the outlet manifolds. During a starting operation of the fuel cell assembly in below-freezing temperatures, the condensed water in the flow channels of the fuel cell plates and at the edges of the outlet manifolds is in the form of ice which may restrict reactant flow. Similarly, reactant flow maldistribution due to liquid water stagnation during normal operation can result.

Typically, to mitigate the formation of condensation at the outlet manifolds of the fuel cell assembly, the operating temperature of the fuel cell assembly is increased. However, increasing the operating temperature may have a negative impact on ohmic resistance due to increased membrane proton resistance as a result of decreased membrane humidification. Also, decreasing the relative humidity of inlet anode and cathode gas streams may achieve the same effect as increasing the operating temperature of the fuel cell assembly resulting in a negative impact on ohmic resistance due to increased membrane proton resistance. To mitigate thermal losses to the end units of the assembly, a thermally resistive barrier layer may be disposed between the fuel cell stack and the end units. As thermal resistivity increases, electrical conductance typically decreases, thereby generating waste heat in the barrier layer and causing the fuel cell assembly to operate inefficiently. To withstand the elevated temperatures that can arise at high current levels due to this waste heat generation in the barrier layer, the end units must be formed from expensive plastics or other materials able to withstand elevated temperatures, thereby increasing the cost of the fuel cell assembly.

During operation of the fuel cell assembly, waste heat from the fuel cell reaction heats the fuel cell assembly and mitigates water condensation and ice formation in the assembly. However, end plates of the fuel cell assembly tend to have a temperature lower than the temperature of intermediate plates of the fuel cell assembly. The unipolar end plates have a lower temperature due to thermal losses to the environment and thermal losses to terminal plates of the fuel cell assembly adjacent thereto. A difference in the temperature of the fuel cell plates throughout the fuel cell assembly may result in inefficient operation, maldistribution of reactants, condensation of water which may lead to ice formation, and a decreased useful life of the fuel cell assembly.

Typically, to ensure a substantially uniform temperature distribution between the plates in the fuel cell assembly, a heating mechanism is disposed adjacent the unipolar end plates to directly transfer thermal energy thereto. A heating mechanism may also be disposed adjacent the terminal plates to transfer thermal energy thereto. Thermal energy is then transferred from the terminal plates to the unipolar end plates. Alternatively, a resistive heating mechanism adapted to heat the unipolar end plates may be connected in parallel to the fuel cell assembly. If a heating mechanism fails and is in a powered state, the end fuel cells may dry out, thereby leading to an electrical short in the fuel cell assembly. Other methods for heating the unipolar end plates include catalytic heating, and providing a bypass plate disposed between the unipolar end plates and the terminal plates.

Also, during operation of the fuel cell assembly, electrical current generated by the fuel cell stack is collected in each electrically conductive fuel cell. The current is transmitted through the stacks, via the fuel cell plates, to terminal plates at either end of the fuel cell stack. The terminal plates are in electrical communication with a current collecting body, such as a bus bar, for example. The current collecting body is in electrical communication with a stack interface unit (SIU) or other electrical components of the fuel cell power system. High temperatures in the stack end units will cause heat to flow with the electrical current to the SIU and/or other electrical components, thereby resulting in increased temperatures in the SIU and/or other electrical components which may result in component failure or requiring costly components that can operate at elevated temperatures.

It would be desirable to produce a fuel cell assembly having a thermally insulating, electrically conducting layer disposed between a terminal plate and a unipolar end plate thereof to mitigate thermal losses from the unipolar end plate and fluid condensation and ice formation on the unipolar end plate while maximizing an electric current flowing through the layer.

SUMMARY OF THE INVENTION

Concordant and congruous with the present invention, a fuel cell assembly having a thermally insulating, electrically conducting layer disposed between a terminal plate and a unipolar end plate thereof to mitigate thermal losses from the unipolar end plate, and fluid condensation and ice formation on the unipolar end plate while maximizing an electric current flowing through the layer, has surprisingly been discovered.

In one embodiment, a barrier layer for a fuel cell assembly comprises a thermally insulating layer having a first surface and a second surface; and an electrically conducting layer formed on the first surface of said thermally insulating layer.

In another embodiment, a barrier layer for a fuel cell assembly comprises a thermally insulating layer having a first surface, a second surface, and a plurality of apertures formed therethrough; and an electrically conducting layer formed on the first surface of said thermally insulating layer, the second surface of said thermally insulating layer, and the portions of said thermally insulating layer forming the plurality of apertures.

In another embodiment, a fuel cell assembly comprises a plurality of fuel cells arranged in a stack; a first terminal plate disposed at a first end of the stack of said fuel cells; a second terminal plate disposed at a second end of the stack of said fuel cells; and a barrier layer having an electrically conducting layer formed on a first surface of a thermally insulating layer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
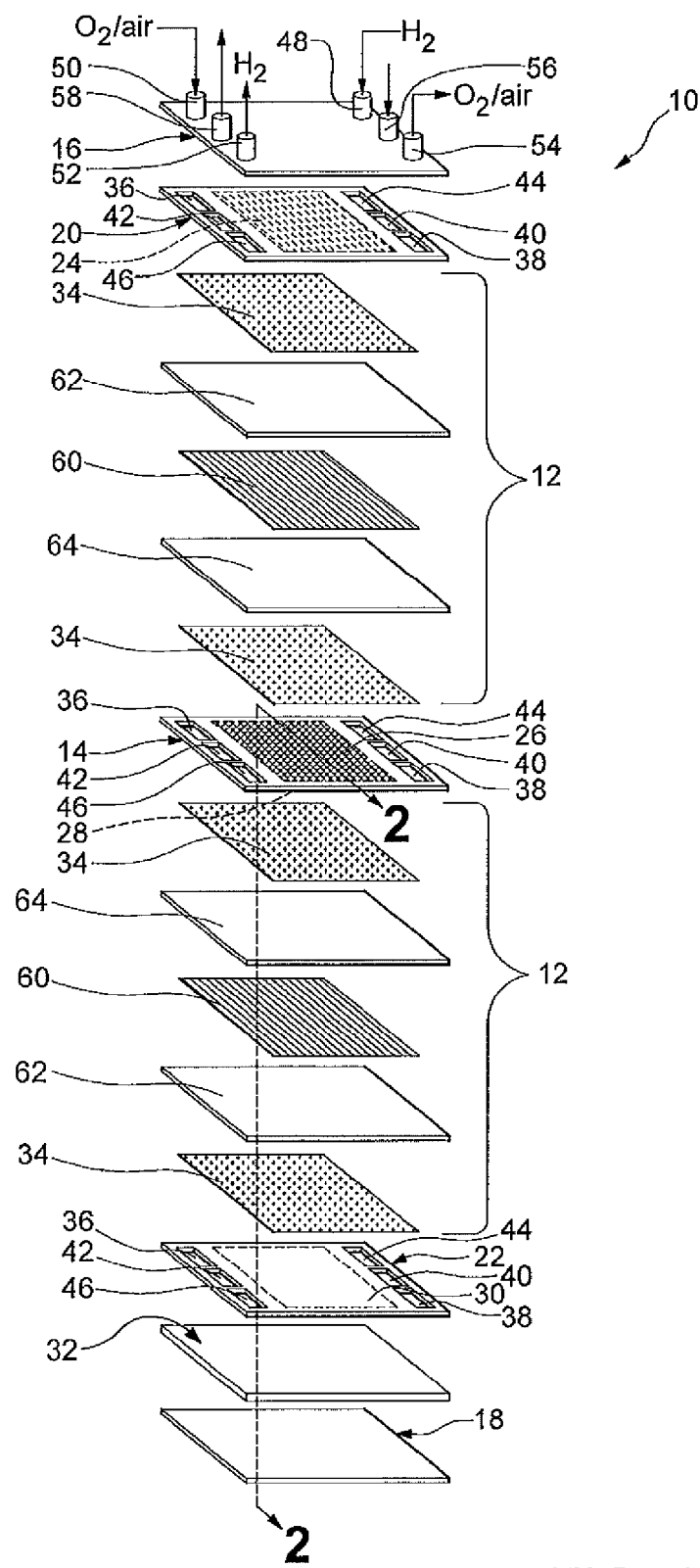
FIG. 1 is an exploded perspective view of a fuel cell stack according to an embodiment of the invention.

FIG. 1 depicts a fuel cell assembly 10 having a two fuel cell stack. The fuel cell assembly 10 is a proton exchange membrane (REM) fuel cell assembly. Each of the two fuel cells includes a unitized electrode assembly (UEA) 12. The UEAs 12 are separated from each other by an electrically conductive bipolar plate 14. The UEAs 12 have anode and cathode diffusion media (DM) 34, an anode 62, a cathode 64, and an electrolyte membrane 60. For simplicity, a fuel cell assembly 10 with a two-cell fuel cell stack (i.e. one bipolar plate) is illustrated and described in FIG. 1, it being understood that a typical fuel cell assembly has many more such fuel cells and bipolar plates.

The UEAs 12 and bipolar plate 14 are stacked together between a pair of terminal plates 16, 18 and a pair of unipolar end plates 20, 22. The unipolar end plate 20, both working faces of the bipolar plate 14, and the unipolar end plate 22 include respective active areas 24, 26, 28, 30. The active areas 24, 26, 28, 30 typically contain flow fields for distributing gaseous reactants such as hydrogen gas and air over the anode 62 and the cathode 64, respectively, of the UEAs 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer. Gas-permeable diffusion media 34 are disposed adjacent both sides of the bipolar plate 14. The unipolar end plates 20, 22 are also disposed adjacent the diffusion media 34. In the embodiment shown in FIGS. 1 and 2, a barrier layer 32 is disposed between the unipolar end plate 22 and the terminal plate 18.

Figure 2:
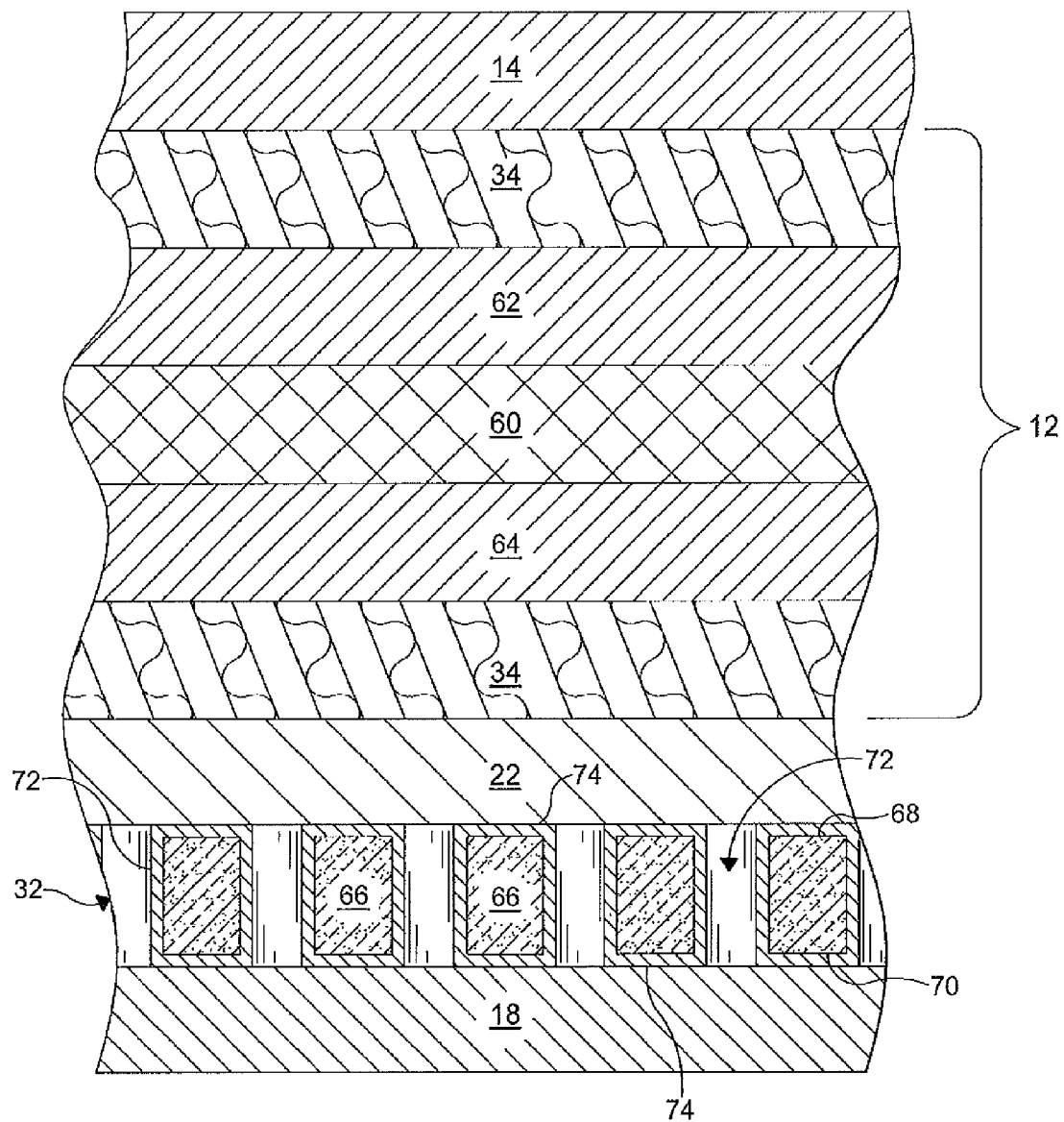
FIG. 2 is an enlarged fragmentary side, cross-sectional elevational view of a portion of the fuel cell assembly shown in FIG. 1 taken along line 2-2 according to an embodiment of the invention.

As best shown in FIG. 2, the barrier layer 32 is formed from an insulating layer 66 having a first surface 68 and a second surface 70. The barrier layer 32 has plurality of apertures 72 formed therethrough. The apertures 72 are formed in linear rows, but the apertures 72 may be randomly formed in the barrier layer 32 or the apertures 72 may be formed in another pattern, as desired. An electrically conducting layer 74 is formed on each of the first surface 68, the second surface 70, and the portions of the barrier layer 32 forming the apertures 72. The electrically conducting layer 74 may be formed on any one or more of the first surface 68, the second surface 70, and the walls of the barrier layer 32 forming the apertures 72, as desired. In the embodiment shown, the insulating layer 66 is a carbon foam, but the insulating layer 66 may be formed from any thermally insulating material such as a plastic, a syntactic foam, and a ceramic. The insulating layer 66 may also be micro-truss structure formed from a plastic, as described in further detail hereinbelow and shown in FIGS. 5 and 6. The electrically conducting layer 74 is typically formed from a nickel-based metal. More favorable results have been obtained with a barrier layer 32 having a nickel-based electrically conducting layer 74 having a thickness from about 0.5 microns to about 2 microns. More favorable results have been obtained from a nickel-based electrically conducting layer 74 having a thickness of about 0.5 microns. The electrically conducting layer 74 may also be formed from a chromium-based metal, such as a chrome, having a thickness from about 10 microns to about 17 microns. It is understood that the electrically conducting layer 74 may be formed from any metal or other conducting material and may have any thickness as desired and as required based on the size and operating conditions of the fuel cell assembly 10. The electrically conducting layer 74 may be applied to the insulating layer 66 using an electroless plating process, an electroplating process, a brushing process, a spraying process, a dipping process, and the like. It is understood that a second barrier layer (not shown) may be disposed between the unipolar end plate 20 and the terminal plate 16, as desired.

The bipolar plate 14, unipolar end plates 20, 22, and the UEAs 12 each include a cathode supply aperture 36 and a cathode exhaust aperture 38, a coolant supply aperture 40 and a coolant exhaust aperture 42, and an anode supply aperture 44 and an anode exhaust aperture 46. Supply manifolds and exhaust manifolds of the fuel cell assembly 10 are formed by an alignment of the respective apertures 36, 38, 40, 42, 44, 46 in the bipolar plate 14, unipolar end plates 20, 22, and the UEAs 12. The hydrogen gas is supplied to an anode supply manifold via an anode inlet conduit 48. The air is supplied to a cathode supply manifold of the fuel cell assembly 10 via a cathode inlet conduit 50. An anode outlet conduit 52 and a cathode outlet conduit 54 are also provided for an anode exhaust manifold and a cathode exhaust manifold, respectively. A coolant inlet conduit 56 is provided for supplying liquid coolant to a coolant supply manifold. A coolant outlet conduit 58 is provided for removing coolant from a coolant exhaust manifold. It should be understood that the configurations of the various inlet conduits 48, 50, 56 and outlet conduits 52, 54, 58 in FIG. 1 are for the purpose of illustration, and other configurations may be chosen as desired.

UEAs 12 for use in the fuel cell assembly 10 may include a plurality of components. As shown in FIG. 2, the UEA 12 includes the electrolyte membrane 60, the anode 62, the cathode 64, and the diffusion media 34. The components of the UEA 12 are assembled during production of the UEA 12 and affixed to one another by any conventional process such as hot pressing, for example. An adhesive may be used between individual components, as desired. For clarity, the diffusion media 34 and electrolyte membrane 60 in FIG. 1 have been linearly displaced to more clearly show the electrolyte membrane 60.

The anode 62 and the cathode 64 of the fuel cell assembly 10 may be disposed on the electrolyte membrane 60 and/or the diffusion media 34. The electrode may be formed by a catalyst ink applied to the components by any conventional process such as spraying, dipping, brushing, roller transfer, slot die coating, gravure coating, Meyer rod coating, decal transfer, and printing, for example. Either the anode 62 or the cathode 64 may be referred to as an electrode.

The electrolyte membrane 60 may be a membrane layer formed from an ionomer. The ionomer perfluorosulfonic acid (PFSA) such as sold under the trademark Nafion® NRE211, is a typical ionomer well known in the art for use as the electrolyte membrane 60 of a fuel cell. The electrolyte membrane 60 is disposed between the anode 62 and the cathode 64.

Generally, during operation of a fuel cell power system, a stream of hydrogen is fed into the anode side of the fuel cell assembly 10. Concurrently, a stream of oxygen is fed into the cathode side of the fuel cell assembly 10. On the anode side, the hydrogen in the hydrogen stream is catalytically split into protons and electrons. The oxidation half-cell reaction is represented by: $H_2 \leftrightarrows 2H^+ + 2e^-$. In a PEM fuel cell, the protons permeate through the membrane to the cathode side. The electrons travel along an external load circuit to the cathode side creating the current of electricity of the fuel cell assembly 10. On the cathode side, the oxygen in the oxidant stream combines with the protons permeating through the membrane and the electrons from the external circuit to form water molecules. This reduction half-cell reaction is represented by: $4H^+ + 4e^- + O_2 \leftrightarrows 2H_2O$. Anode exhaust from the anode side is typically recirculated through the system to maintain high anode conversion to electricity and low hydrogen emissions.

Cathode exhaust from the cathode side is exhausted to atmosphere. A control module (not shown) regulates the conditions of the hydrogen stream, oxygen stream, and exhaust streams by operating various control valves (not shown), and compressors (not shown) in response to signals from pressure sensors (not shown) and electrical power sensors (not shown) connected to the fuel cell assembly 10. One exemplary exhaust system is disclosed in commonly-owned U.S. Pat. No. 7,235,318 for FUEL CELL SYSTEM BACK-PRESSURE CONTROL WITH A DISCRETE VALVE, hereby incorporated herein by reference in its entirety.

When the fuel cell assembly 10 is in operation, the barrier layer 32 mitigates a loss of thermal energy from the unipolar end plate 22 to the environment, and from the unipolar end plate 22 to the terminal plate 18 and to a lower end unit (not shown) of the fuel cell assembly 10. Minimizing the temperature of the lower end unit mitigates the need for separate cooling systems and other thermal energy management systems in other components of a fuel cell power system incorporating the fuel cell assembly 10, such as a stack interface unit (SIU). By mitigating the need for separate cooling systems for other components of the fuel cell power system, the cost and complexity of the fuel cell power system is minimized. Furthermore, by minimizing the thermal energy transferred to the barrier layer 32 and subsequently transferred to the lower end unit, the required thermal energy tolerance of the lower end unit is minimized. By minimizing the required thermal energy tolerance of the lower end unit, specialty plastics are not required for the manufacturing thereof and the cost to manufacture the lower end unit is minimized.

Because the thermal energy of the unipolar end plate 22 is conserved by the insulating layer 66 of the barrier layer 32, a temperature of the unipolar end plate 22 is maximized during all operational modes, especially during a start-up operation of the fuel cell assembly 10 in below-freezing temperatures. By maximizing the temperature of the unipolar end plate 22 during typical operation, liquid water formed from condensed water vapor in the channels of the unipolar end plate 22 is minimized. Similarly, because condensation is minimized, the formation of ice in the channels of the unipolar end plate 22 in below-freezing temperatures is also minimized, thereby facilitating efficient below-freezing start-up of the fuel cell assembly 10. Additionally, by maximizing the temperature of the unipolar end plate 22 during start-up of the fuel cell system in below-freezing temperatures, formation of liquid water or ice within the anode 62 and the cathode 64 is minimized, thereby facilitating efficient cold start-up of the fuel cell assembly 10. An undesired increase in the thermal energy generation due to electrical resistance of the barrier layer 32 may be compensated for by an amount of the coolant flowing through the fuel cell assembly 10. By conserving the thermal energy of the unipolar end plate 22, a heating mechanism is not required to heat the unipolar end plate 22, thereby minimizing the complexity and cost of the fuel cell assembly 10.

The electrically conducting layer 74 provides an electrically conducting material that maximizes the flow of electrical current from the plates 14, 20, 22 of the fuel cell assembly 10 to the terminal plate 18. Because the portion of the electrically conducting layer 74 formed on the first surface 68 is connected to the portion of the electrically conducting layer 74 formed on the second surface 70 by the portion of the electrically conducting layer 74 formed on the portions of the insulating layer 66 forming the apertures 72, the electrically conducting layer 74 forms a continuous path for the flow of electrical current across the thickness of the barrier layer 32. By having a continuous connection of the portions of the electrically conducting layer 74, the electrical conductivity of the barrier layer 32 and the flow of electrical current therethrough is maximized. By maximizing the flow of electrical current from the fuel cell assembly 10 through the barrier layer 32 to the terminal plate 18, the power output of the fuel cell power system is also maximized. This is of particular importance during peak usage of the fuel cell power system incorporating the fuel cell assembly 10.

Figure 3:
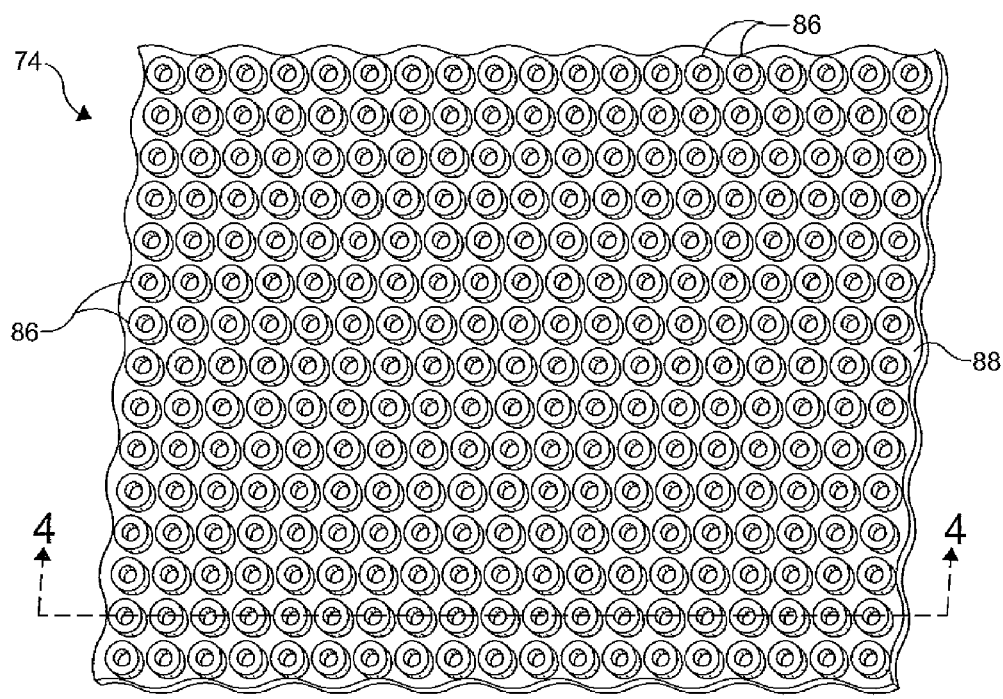
FIG. 3 is a fragmentary top plan view of a barrier layer according to another embodiment of the invention.
Figure 4:
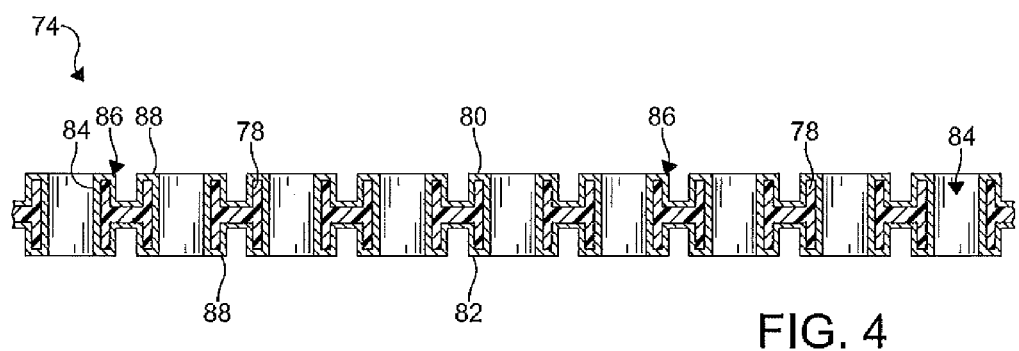
FIG. 4 is an enlarged fragmentary side, cross-sectional elevational view of the barrier layer shown in FIG. 3 taken along line 4-4.

FIGS. 3 and 4 illustrate a barrier layer 76 according to another embodiment of the invention. The barrier layer 76 is similar to the barrier layer 32 except as described hereinbelow. Like the barrier layer 32, the barrier layer 76 may be used in the fuel cell assembly 10 of FIG. 1 disposed between terminal plate 18 and the unipolar end plate 22. It is understood that a second barrier layer (not shown) similar to the barrier layer 32 or the barrier layer 76 may be disposed between the unipolar end plate 20 and the terminal plate 16 of the fuel cell assembly 10, as desired.

The barrier layer 76 is formed from an insulating layer 78 having a first surface 80, a second surface 82, and a plurality of protuberances 86 formed on each surface 80, 82. As best shown in FIG. 4, a protuberance 86 on the first surface 80 cooperates with a corresponding protuberance 86 on the second surfaces 82 to form a column having a substantially circular cross-sectional shape. The protuberances 86 may have an ovular, triangular, or rectangular cross-sectional shape, as desired. Each of the columns formed by the plurality of protuberances 86 has an aperture 84 formed therethrough. The protuberances 86 are formed in a linear row, but the protuberances 86 may be formed in the barrier layer 76 in a random pattern or in a desired design. Because the barrier layer 76 includes the columnar protuberances 86 as opposed to a solid layer, material used to form the barrier 76 between the protuberances 86 is minimized, thereby minimizing a thermal mass and a thermal contact area of the barrier layer 76.

A electrically conducting layer 88 is formed on each of the first surface 80, the second surface 82, and the portions of the insulating layer 78 forming the apertures 84. The electrically conducting layer 88 may be formed on any one or more of the first surface 80, the second surface 82, and the portions of the barrier layer 76 forming the apertures 84, as desired. The insulating layer 78 is typically formed from a thermally insulating plastic material. The electrically conducting layer 88 is typically formed from a nickel-based metal, such as an electroless nickel, for example. More favorable results have been obtained with a barrier layer 76 having an electrically conducting nickel layer 88 having a thickness from about 10 microns to about 50 microns. More favorable results have been obtained by a electrically conducting layer nickel 88 having a 25 micron thickness. It is desirable to form the electrically conducting layer 88 from a material which will provide a low contact resistance between the barrier layer 76 and the terminal plate 18, as well as the unipolar plate 22. It is understood that the electrically conducting layer 88 may be formed from any metal or other conducting material and may have any thickness as desired and as required based on the size and operating conditions of the fuel cell assembly 10. The electrically conducting layer 88 may be applied to the insulating layer 78 using an electroless plating process, an electroplating process, a brushing process, a spraying process, a dipping process, and the like, for example.

Figure 5:
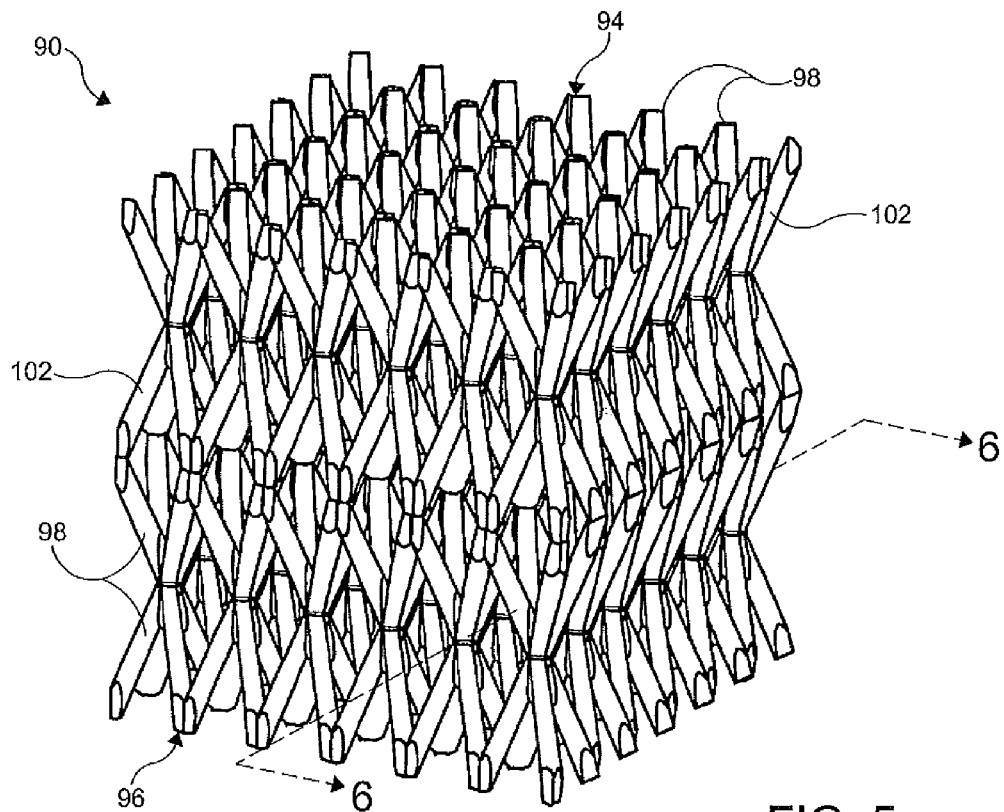
FIG. 5 is an enlarged fragmentary perspective view of a barrier layer according to another embodiment of the invention.
Figure 6:
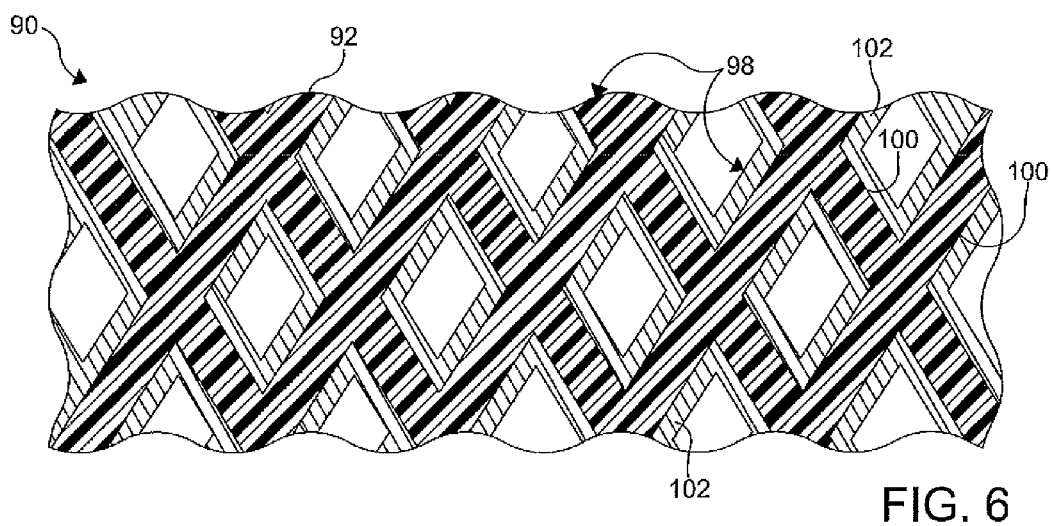
FIG. 6 is an enlarged fragmentary schematic cross-sectional elevational view of the barrier layer shown in FIG. 5 taken along line 6-6.

FIGS. 5 and 6 illustrate a barrier layer 90 according to another embodiment of the invention. The barrier layer 90 is similar to the barrier layers 32 except as described hereinbelow. Like the barrier layer 32, the barrier layer 90 may be used in the fuel cell assembly 10 of FIG. 1 disposed between terminal plate 18 and the unipolar end plate 22. It is understood that a second barrier layer (not shown) similar to the barrier layer 32, the barrier layer 76, or the barrier layer 90 may be disposed between the unipolar end plate 20 and the terminal plate 16 of the fuel cell assembly 10, as desired.

The barrier layer 90 is formed from a micro-truss structure 92 having a first surface 94 and a second surface 96. A plurality of columnar members 98 cooperates to form the micro-truss structure 92. Void space equivalent in function to the apertures 72, 84 is formed between the members 98 of the micro-truss structure 92. The members 98 are generally columnar and have a substantially circular cross-sectional shape, but the members 98 may have an ovular, triangular, rectangular, or other cross-sectional shape, as desired. A electrically conducting layer 102 is formed on an outer surface 100 of each of the members 98. The surfaces 94, 96 of the barrier layer 90 are adapted to contact the unipolar end plate 22 and the terminal plate 18, respectively. As shown in FIG. 5, the barrier layer 90 includes four stacked layers of micro-trusses. It is understood that the barrier layer 90 may include any number of layers of micro-trusses, as desired.

The micro-truss structure 92 is a thermally insulating layer formed from a thermally insulating plastic material. The plastic material may be a light/radiation curing polymer such as those disclosed in commonly owned U.S. patent application Ser. No. 12/339,308 hereby incorporated herein by reference in its entirety. It is understood that the micro-truss structure 92 may be formed from any thermally insulating material, as desired. Use of a thermally insulating micro-truss structure 92 provides the barrier layer 90 with increased strength and rigidity capable of withstanding compressive forces placed on the fuel cell assembly 10 during assembly. Furthermore, an amount of material used to build the micro-truss structure 92 may be minimized compared to sheet-like structures. By minimizing the material to form the micro-truss structure 92, a thermal mass and a thermal contact area of the barrier layer 90 is also minimized.

The electrically conducting layer 102 is formed from nickel-based metal. More favorable results have been obtained with a barrier layer 90 having a nickel-based electrically conducting layer 102 having a thickness from about 2 microns to about 20 microns. More favorable results have been obtained from a nickel-based electrically conducting layer 102 having a thickness of about 5 microns. The electrically conducting layer 102 may also be formed from a nickel-chromium alloy or a nickel-cobalt alloy, having a thickness from about 10 microns to about 20 microns. It is understood that the electrically conducting layer 102 may be formed from any metal or other conducting material and may have any thickness as desired and as required based on the size and operating conditions of the fuel cell assembly 10. The electrically conducting layer 102 may be applied to the micro-truss structure 92 using an electroless plating process, an electroplating process, a brushing process, a spraying process, a dipping process, and the like.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
   a plurality of fuel cells arranged in a stack, wherein a first fuel cell is disposed at a first end of the stack of said fuel cells and includes a first stack end plate, and a second fuel cell is disposed at a second end of the stack of said fuel cells and includes a second stack end plate;
   a first terminal plate disposed at the first end of the stack of said fuel cells;
   a second terminal plate disposed at the second end of the stack of said fuel cells;
   a thermally insulating layer disposed between the first stack end plate and said first terminal plate, said thermally insulating layer having a first surface and an opposing second surface defining a thickness of said thermally insulating layer, wherein a plurality of apertures is formed through the thickness of said thermally insulating layer, wherein said thermally insulating layer includes a plurality of protuberances formed on the first surface thereof; and
   an electrically conducting layer formed on the first surface and the second surface of said thermally insulating layer, wherein a plurality of protuberances is formed on the second surface of said thermally insulating layer, each of the protuberances on the first surface cooperating with a corresponding one of the protuberances on the second surface to form a plurality of columns.

2. The fuel cell assembly of claim 1, wherein said electrically conducting layer is further formed on the portions of said thermally insulating layer forming the plurality of apertures.

3. The fuel cell assembly of claim 1, wherein each of the plurality of apertures is formed through one of the protuberances formed on the first surface of said thermally insulating layer.

4. The fuel cell assembly of claim 1, wherein each of the plurality of apertures is formed through one of the columns.

5. The fuel cell assembly of claim 1, wherein said thermally insulating layer is formed from one of a carbon foam, a syntactic foam, and a plastic.

6. The fuel cell assembly of claim 1, wherein said electrically conducting layer is formed from a metal.

7. The fuel cell assembly of claim 6, wherein the metal is one of a nickel-based metal and a chromium-based metal.

8. A fuel cell assembly comprising:
- a plurality of fuel cells arranged in a stack, wherein a first fuel cell is disposed at a first end of the stack of said fuel cells and includes a first stack end plate, and a second fuel cell is disposed at a second end of the stack of said fuel cells and includes a second stack end plate;
- a first terminal plate disposed at the first end of the stack of said fuel cells;
- a second terminal plate disposed at the second end of the stack of said fuel cells;
- a thermally insulating layer disposed between the first stack end plate and said first terminal plate wherein a first surface of said thermally insulating layer is adjacent the first stack end plate and an opposing second surface is adjacent said first terminal plate, the first surface and the second surface defining a thickness of said thermally insulating layer, and a plurality of apertures is formed through the thickness of said thermally insulating layer, wherein said thermally insulating layer includes a plurality of protuberances formed on the first surface thereof, each of the plurality of apertures is formed through one of the protuberances formed on the first surface of said thermally insulating layer; and
- an electrically conducting layer formed on the first surface of said thermally insulating layer, the second surface of said thermally insulating layer, and the portions of said thermally insulating layer forming the plurality of apertures, wherein a plurality of protuberances is formed on the second surface of said thermally insulating layer, each of the protuberances on the first surface cooperating with a corresponding one of the protuberances on the second surface to form a plurality of columns.

9. The fuel cell assembly of claim 8, wherein each of the plurality of apertures is formed through one of the columns.

\* \* \* \* \*